United States Patent
Nalette et al.

(10) Patent No.: US 7,736,416 B2
(45) Date of Patent: Jun. 15, 2010

(54) THERMALLY LINKED MOLECULAR SIEVE BEDS FOR $CO_2$ REMOVAL

(75) Inventors: Timothy A. Nalette, West Stafford, CT (US); Tony Rector, Broad Brook, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 626 days.

(21) Appl. No.: 11/710,730

(22) Filed: Feb. 26, 2007

(65) Prior Publication Data

US 2008/0202339 A1 Aug. 28, 2008

(51) Int. Cl.
*B01D 53/02* (2006.01)

(52) U.S. Cl. .................. 95/1; 95/117; 95/139; 95/148; 96/121; 96/130; 96/143

(58) Field of Classification Search .................. 95/120, 95/139; 96/122, 130, 126, 133
See application file for complete search history.

(56) References Cited

U.S. PATENT DOCUMENTS

| 2,545,194 | A | | 3/1951 | Colburn et al. |
|---|---|---|---|---|
| 3,100,685 | A | * | 8/1963 | Duffey .................. 423/437.1 |
| 4,005,708 | A | | 2/1977 | Netteland et al. |
| 4,444,727 | A | | 4/1984 | Yanagihara et al. |
| 4,810,266 | A | | 3/1989 | Zinnen et al. |
| 4,822,383 | A | | 4/1989 | Brose et al. |
| 5,281,254 | A | | 1/1994 | Birbara et al. |
| 5,376,614 | A | | 12/1994 | Birbara et al. |
| 5,876,488 | A | | 3/1999 | Birbara et al. |
| 6,364,938 | B1 | | 4/2002 | Birbara et al. |
| 6,605,132 | B2 | | 8/2003 | Fielding et al. |
| 6,709,483 | B1 | | 3/2004 | Hodgson, Jr. |
| 6,755,892 | B2 | | 6/2004 | Nalette et al. |
| 6,946,288 | B2 | | 9/2005 | Blais et al. |
| 2003/0015093 | A1 | | 1/2003 | Wegeng et al. |

FOREIGN PATENT DOCUMENTS

| EP | 0343799 A2 | 11/1989 |
|---|---|---|
| EP | 0438282 A1 | 7/1991 |
| WO | WO0213948 A2 | 2/2002 |

OTHER PUBLICATIONS

The Search Report of the European Patent Office in counterpart European Application No. 07255088 filed Dec. 31, 2007.

* cited by examiner

*Primary Examiner*—Robert A Hopkins
(74) *Attorney, Agent, or Firm*—Kinney & Lange, P.A.

(57) ABSTRACT

A carbon dioxide ($CO_2$) removal system includes a first sorbent bed and a second sorbent bed. Each of the first and second sorbent beds has a molecular sieve sorbent for adsorbing or desorbing $CO_2$. One of the sorbent beds adsorbs $CO_2$ and the other of the sorbent beds desorbs $CO_2$. The first and second sorbent beds are thermally connected to transfer heat between the sorbent beds.

21 Claims, 1 Drawing Sheet

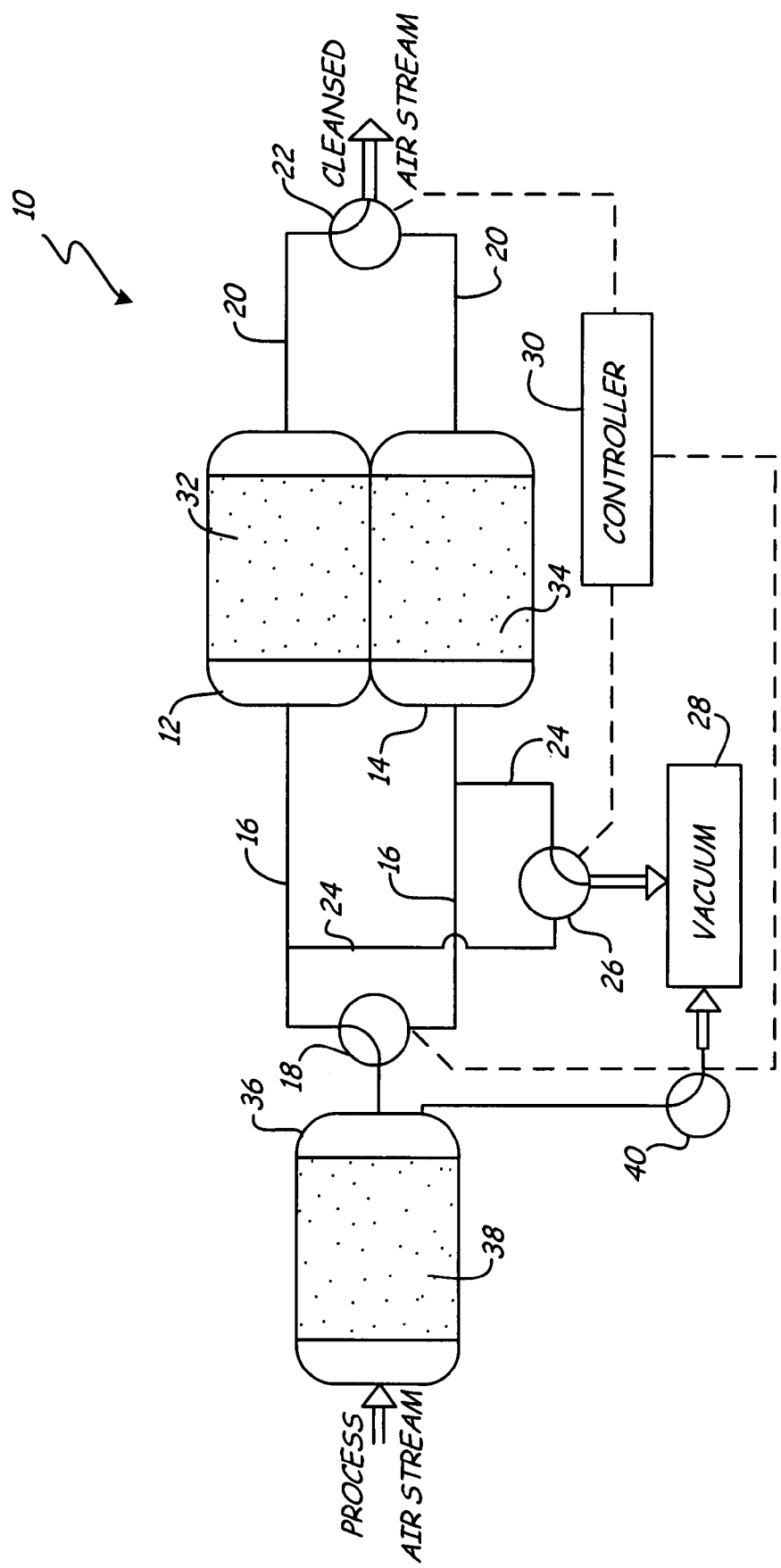

THERMALLY LINKED MOLECULAR SIEVE BEDS FOR $CO_2$ REMOVAL

BACKGROUND OF THE INVENTION

The present invention relates generally to the field of carbon dioxide removal. In particular, the present invention relates to the removal of carbon dioxide using molecular sieves.

Exposure to carbon dioxide ($CO_2$) for extended periods of time can be harmful to the health of humans and other mammals. Thus, a carbon dioxide concentration level of less than approximately 1% is typically maintained in enclosed environments, such as submarines, spacecrafts, or space suits. Current methods of removing carbon dioxide from the air include using solid carbon dioxide sorbents including, but are not limited to: soda lime, zeolites, molecular sieves, solid oxides, alkali metal carbonates, alkali metal hydroxides, amines, and combinations thereof. A specific example of a carbon dioxide removal system using an amine as the sorbent is discussed in U.S. Pat. No. 6,364,938 (assigned to Hamilton Sundstrand Corporation), which is incorporated herein by reference.

Molecular sieve carbon dioxide removal systems currently used in the art typically contain sorbent beds for removing water and carbon dioxide. The sorbent beds are regenerated after the beds are saturated by using embedded electrical heaters. The sorbent beds typically operate in an adiabatic mode without any integral or active cooling. As a result, the sorbent beds operate at elevated temperatures, with a negative effect on adsorption isotherms. One method of mitigating this effect is by integral cooling of the sorbent beds. However, this increases the complexity of the carbon dioxide removal system.

There is a need in the art for a carbon dioxide removal system which operates substantially isothermally and at ambient temperature.

BRIEF SUMMARY OF THE INVENTION

A carbon dioxide ($CO_2$) removal system includes a first sorbent bed and a second sorbent bed. Each of the first and second sorbent beds has a molecular sieve sorbent for adsorbing or desorbing $CO_2$. One of the sorbent beds adsorbs $CO_2$ and the other of the sorbent beds desorbs $CO_2$. The first and second sorbent beds are thermally connected to transfer heat between the sorbent beds.

BRIEF DESCRIPTION OF THE DRAWINGS

The sole FIGURE is a schematic view of a carbon dioxide removal system.

DETAILED DESCRIPTION

The sole FIGURE shows a schematic view of carbon dioxide ($CO_2$) removal system 10. $CO_2$ removal system 10 operates substantially isothermally and approximately at ambient temperature and allows an increase in the effective loading of $CO_2$ during the adsorption process. $CO_2$ removal system 10 generally includes a first sorbent bed 12, a second sorbent bed 14, inlet passage 16, inlet valve 18, outlet passage 20, outlet valve 22, carbon dioxide passage 24, carbon dioxide valve 26, vacuum 28, and controller 30. First and second sorbent beds 12 and 14 are thermally linked and heat is transferred between them. The heat extracted from one, adsorbing sorbent bed is used as energy to regenerate the other, desorbing sorbent bed. Because a portion of the energy required for regenerating $CO_2$ removal system 10 is provided by heat transfer between the adsorbing sorbent bed and the desorbing sorbent bed, the overall regeneration power requirement of $CO_2$ removal system 10 is reduced. In an exemplary embodiment, thermally linking first and second sorbent beds 12 and 14 increases the performance of $CO_2$ removal system 10 by approximately 30%. $CO_2$ removal system 10 may be used in any enclosed environment where removal of carbon dioxide is of importance, including, but not limited to, spacecraft.

Inlet passage 16 introduces a process air stream into $CO_2$ removal system 10 from an enclosed environment. The process air stream generally includes water and carbon dioxide. Inlet valve 18 is connected to inlet passage 16 upstream of first and second sorbent beds 12 and 14 and is switchable between a first position and a second position to control the direction of the process air stream into either first sorbent bed 12 or second sorbent bed 14. When inlet valve 18 is in the first position, the process air stream is allowed to flow only into first sorbent bed 12 and cannot enter second sorbent bed 14. When inlet valve 18 is in the second position, the process air stream is allowed to flow only into second sorbent bed 14 and cannot enter first sorbent bed 12. Although the sole FIGURE depicts only one inlet valve, two inlet valves may also be used, depending on the configuration of inlet passage 16, to control flow of the process air stream into first and second sorbent beds 12 and 14 without departing from the intended scope of the present invention.

First sorbent bed 12 and second sorbent bed 14 contain first sorbent 32 and second sorbent 34, respectively, and function to adsorb carbon dioxide in the process air stream. First sorbent bed 12 and second sorbent bed 14 are thermally linked to one another such that they may operate isothermally and at ambient temperature. First and second sorbent beds 12 and 14 may be thermally linked by direct physical contact or indirect physical contact. In an exemplary embodiment, first and second sorbent beds 12 and 14 are indirectly connected through a heat exchanger or heat pipe. At any given time, one of sorbent beds 12, 14 is adsorbing carbon dioxide and the other sorbent bed 12, 14 is desorbing carbon dioxide. For ease of discussion, $CO_2$ removal system 10 will discussed assuming that first sorbent bed 12 is adsorbing carbon dioxide and that second sorbent bed 14 is desorbing carbon dioxide (regenerating). However, it should be noted that first and second sorbent beds 12 and 14 are constantly working in conjunction with one another. Once first sorbent bed 12 is fully saturated with carbon dioxide, inlet valve 18 will switch to the second position and second sorbent bed 14 will begin adsorbing carbon dioxide and first sorbent bed 12 will begin regenerating. Sorbents 32 and 34 of first and second sorbent bed 12 and 14, respectively, may be any sorbent capable of adsorbing carbon dioxide, including, but not limited to: a 4A molecular sieve or a 5A molecular sieve.

Thermal linking of first and second sorbent beds 12 and 14 provides a passive method of cooling first (adsorbing) sorbent bed 12 by transferring the exothermic heat created by the adsorption process to second sorbent bed 14. Because the adsorption process generates heat, first sorbent bed 12 needs to be cooled down. If the temperature of first sorbent bed 12 substantially increases above ambient temperature, adsorption will not occur. In contrast to the adsorption process, the desorption process is endothermic and requires energy to proceed. Thus, because the regeneration process is endothermic, second (desorbing) sorbent bed 14 will decrease in temperature, reaching equilibrium very quickly, with the rate of desorption decreasing as the temperature decreases. First and second sorbent beds 12 and 14 are thus thermally linked such that the heat generated from the adsorption process in first sorbent bed 12 is transferred to second sorbent bed 14 at a rate to maintain both the adsorption and the desorption processes at increased levels while still at ambient temperature. A temperature gradient is established between first and second sorbent beds 12 and 14 that allows for energy transfer between them. $CO_2$ removal system 10 thus operates by connecting first sorbent bed 12 and second sorbent bed 14 in a cyclic nature with one bed adsorbing and one bed desorbing. In addition, the heat transfer allows first and second sorbent beds 12 and 14 to operate substantially isothermally.

Outlet passage 20 is connected to first and second sorbent beds 12 and 14 and expels cleansed air back into the environment. Outlet valve 22 is connected to outlet passage 20 downstream of first and second sorbent beds 12 and 14 and is switchable between a first position and a second position to allow cleansed process air back into the environment. When outlet valve 22 is in the first position, the process air stream now cleansed of carbon dioxide is allowed to flow from first sorbent bed 12 back into the enclosed environment. The process air stream cannot flow from second sorbent bed 14 through outlet passage 20. When outlet valve 22 is in the second position, the process air stream is allowed to flow from second sorbent bed 14 into the enclosed environment and cannot flow from first sorbent bed 12. When first sorbent bed 12 is adsorbing carbon dioxide, outlet valve 22 is in the first position and allows the cleansed process air stream to cycle back into the enclosed environment. Second sorbent bed 14, which is desorbing and may be carbon dioxide rich, is not allowed to be expelled into the environment. Although the sole FIGURE depicts only one outlet valve, two outlet valves may also be used, depending on the configuration of outlet passage 20, to control flow of the process air stream back into the enclosed environment without departing from the intended scope of the present invention.

Carbon dioxide passage 24 is connected to inlet passage 16 upstream of first and second sorbent beds 12 and 14. Carbon dioxide valve 26 is connected to carbon dioxide passage 24 and is positioned downstream of inlet valve 18. Carbon dioxide valve 26 is switchable between a first position and a second position to control the introduction of carbon dioxide enriched into air vacuum 28. When carbon dioxide valve 26 is in the first position, the process air stream from first sorbent bed 12 is allowed to flow from first sorbent bed 12 to vacuum 28. When carbon dioxide valve 26 is in the second position, the process air stream from second sorbent bed 14 is allowed to flow from second sorbent bed 14 to vacuum 28. Thus, when first sorbent bed 12 is adsorbing carbon dioxide and second sorbent bed 14 is desorbing carbon dioxide, carbon dioxide valve 26 is in the second position and allows the carbon dioxide enriched stream to flow from second sorbent bed 14 through carbon dioxide passage 24 and into vacuum 28. Although the sole FIGURE depicts only one carbon dioxide valve, two carbon dioxide valves may also be used, depending on the configuration of carbon dioxide passage 24, to control the flow of a carbon dioxide enriched stream to vacuum 28 without departing from the intended scope of the present invention.

Vacuum 28 is connected to carbon dioxide passage 24 and reduces the pressure of first and second sorbent beds 12 and 14 to draw and expel the carbon dioxide enriched stream from first and second sorbent beds 12 and 14. In an exemplary embodiment, vacuum reduces the pressure of first and second sorbent beds 12 and 14 to less than approximately 1 millimeter of mercury (0.133 kilopascals). The rate of desorption of the desorbing bed thus depends in part on the pressure at which vacuum 28 is running. The lower the pressure, the greater the efficiency of desorption. In an exemplary embodiment, the enclosed environment is a spacecraft and vacuum 28 is a space vacuum, expelling the contaminated stream into space. In this case, the space vacuum runs at ambient pressure and expands to vacuum because of the close proximity of the vacuum of space. In another embodiment, vacuum 28 includes a compressor and a vacuum pump. The compressor lowers the pressure in desorbing second sorbent bed 14 to a level that allows regeneration of second sorbent bed 14.

Controller 30 is connected to inlet valve 18, outlet valve 22, and carbon dioxide valve 26 and switches valves 18, 22, and 26 between the first and second positions. Controller 30 determines which sorbent bed 12, 14 is adsorbing and which sorbent bed 12, 14 is desorbing and positions valves 18, 22, and 26 accordingly. When first sorbent bed 12 is adsorbing the carbon dioxide, controller 30 positions inlet valve 18 and outlet valve 22 in the first position and carbon dioxide valve 26 in the second position. When second sorbent bed 14 is adsorbing, controller 30 positions inlet valve 18 and outlet valve 22 in the second position and carbon dioxide valve 26 in the first position.

In operation, inlet valve 18 and outlet valve 22 are initially in the first position with the process air stream flowing through first sorbent bed 12 and carbon dioxide valve 26 is initially in the second position with carbon dioxide enriched air from second sorbent bed 14 flowing out to the environment. $CO_2$ removal system 10 then operates as a batch process until first sorbent bed 12 is loaded with carbon dioxide and second sorbent bed 14 is regenerated and essentially free of carbon dioxide. At this stage, inlet valve 18 and outlet valve 22 are switched to the second position to allow the process air stream to flow into second sorbent bed 14 and out to the environment. Carbon dioxide valve 26 is switched to the first position to allow first sorbent bed 12 to desorb the carbon dioxide into vacuum 28. First sorbent bed 12 then desorbs and second sorbent bed 14 adsorbs until second sorbent bed 14 becomes fully loaded with carbon dioxide and first sorbent bed 12 is regenerated. $CO_2$ removal system 10 continues to operate in this cyclic manner, with first and second sorbent beds 12 and 14 alternating between the adsorption process and the desorption process. Similarly, the direction of heat transfer is also cyclic.

$CO_2$ removal system 10 may also optionally include third sorbent bed 36 positioned upstream of first and second sorbent beds 12 and 14. Third sorbent bed 36 includes third sorbent 38 for removing any water from the process air stream before the process air stream enters first and second sorbent beds 12 and 14. The process air stream typically has a relative humidity of between approximately 30% and approximately 70%. Water can poison sorbents 32 and 34 by displacing the adsorbed carbon dioxide in sorbent beds 12 and 14. Thus, to prevent displacement of carbon dioxide by water from the molecular sieves, third sorbent bed 36 is positioned upstream of first and second sorbent beds 12 and 14. In an exemplary embodiment, third sorbent 38 is a 13× molecular sieve.

Once third sorbent bed 36 is saturated with water, the water may be desorbed from third sorbent bed 36 using heat in combination with vacuum 28 or a sweep gas. The heat may be supplied by any means known in the art, including heating rods installed within third sorbent bed 36 or by thermally linking third sorbent bed 36 with another sorbent bed. When a vacuum is used, third sorbent bed 36 is connected to vacuum 28 by water valve 40, which is controlled by controller 30. Water valve 40 is switchable between a first position (closed) and a second (open) position. When water valve 40 is in the first position, third sorbent bed 36 is not connected to vacuum 28 and water is not removed from third sorbent bed 36. When third sorbent bed 36 is ready to be desorbed, controller 30 switches water valve 40 from the first position to the second position, allowing communication between third sorbent bed 36 and vacuum 28. Although the sole FIGURE depicts only one sorbent bed for removing water, $CO_2$ removal system 10 may also include two sorbent beds for removing water working in conjunction with one another, such that one bed is adsorbing water and the other bed is desorbing water. In addition, the two beds may be thermally linked with the adsorbing sorbent bed transferring heat to the desorbing sorbent bed, similar to the process discussed for first and second sorbent beds 12 and 14. When two sorbent beds are used for removing water from the air process stream, there may optionally be two water valves for controlling the flow of water to vacuum 28.

When a sweep gas is used, the sweep gas may be any gas that does not contain water or carbon dioxide and must have a lower partial pressure than the partial pressure at which the water is being adsorbed in order to provide the driving force needed to regenerate third sorbent bed 36. For example, the sweep gas may be the carbon dioxide effluent leaving the sorbent bed that is adsorbing the carbon dioxide. The effluent functions efficiently as a sweep gas because it is dry and at an elevated temperature due to the exothermic adsorbing process. Optionally, when $CO_2$ removal system 10 is located on a spacecraft, the water may be purged from third sorbent bed 36 using heated gas that is returned to the cabin to be removed by a condensing heat exchanger. It should be noted that although $CO_2$ removal system 10 is discussed as including third sorbent bed 36, third sorbent bed 36 is optional and is not required for the operation of $CO_2$ removal system 10. For example, if carbon dioxide is being removed in a dry atmosphere, third sorbent bed 36 would not be needed.

The carbon dioxide removal system includes two thermally linked sorbent beds. The sorbent beds contain molecular sieves for adsorbing carbon dioxide from a process air stream. At any given time, one of the sorbent beds is adsorbing carbon dioxide from the process air stream and the other sorbent bed is regenerating by desorbing the carbon dioxide adsorbed from the process air stream. When the sorbent bed that is adsorbing carbon dioxide becomes saturated, a plurality of valves switch positions such that the sorbent beds switch between adsorbing and desorbing. Thus, the sorbent beds are cyclic with one bed adsorbing and one bed desorbing. Because the adsorption process is exothermic and the desorption process is endothermic, a temperature gradient is established between the two beds that allows for energy transfer between the sorbent beds. The sorbent beds of the carbon dioxide removal system thus operates substantially isothermally, maintains the carbon dioxide removal system at approximately ambient temperature, and provides a portion of the energy required to run the desorption process.

Although the present invention has been described with reference to preferred embodiments, workers skilled in the art will recognize that changes may be made in form and detail without departing from the spirit and scope of the invention.

The invention claimed is:

1. A carbon dioxide ($CO_2$) removal system comprising:
   first and second sorbent beds, each of the sorbent beds having a molecular sieve sorbent for adsorbing or desorbing $CO_2$;
   wherein one of the sorbent beds adsorbs $CO_2$, the other of the sorbent beds desorbs $CO_2$, and the first and second sorbent beds are thermally connected to transfer heat exothermically generated by the sorbent bed adsorbing $CO_2$ to the sorbent bed desorbing $CO_2$.

2. The system of claim 1, and further comprising a controller, wherein the controller determines which of said beds adsorb $CO_2$ and which of the sorbent beds desorb $CO_2$.

3. The system of claim 1, and further comprising a plurality of sorbent beds, wherein each of the plurality of sorbent beds has a molecular sieve sorbent for adsorbing and desorbing $CO_2$.

4. The system of claim 1, wherein the first and second molecular sieve sorbents are selected from the group consisting of: a 4A molecular sieve and a 5A molecular sieve.

5. The system of claim 1, and further comprising a third sorbent bed having a desiccant for adsorbing water, wherein the third sorbent bed is positioned upstream of the first sorbent bed and the second sorbent bed.

6. The system of claim 5, wherein the desiccant is a 13X molecular sieve.

7. The system of claim 1, and further comprising a vacuum connected to the first and second sorbent beds for removing $CO_2$ from the first and second sorbent beds.

8. The system of claim 1, wherein the process is operated substantially isothermally.

9. A system for removing carbon dioxide ($CO_2$) from a process air stream, the system comprising:
   a first sorbent bed having a first molecular sieve;
   a second sorbent bed having a second molecular sieve, wherein the second sorbent bed is thermally connected to the first sorbent bed;
   an inlet passage connectable to the first sorbent bed and the second sorbent bed;
   an inlet valve connected to the inlet passage and switchable between a first position and a second position;
   an outlet passage connectable to the first sorbent bed and the second sorbent bed;
   an outlet valve connected to the outlet passage and switchable between a first position and a second position;
   a carbon dioxide passage connectable to the first sorbent bed and the second sorbent bed; and
   a carbon dioxide valve connected to the carbon dioxide passage and switchable between a first position and a second position;
   wherein heat generated exothermically by adsorption of $CO_2$ is transferred between the first sorbent bed and the second sorbent bed.

10. The system of claim 9, and further comprising a vacuum connectable through the carbon dioxide valve to the first sorbent bed and the second sorbent bed.

11. The system of claim 9, wherein the first and second molecular sieves are selected from the group consisting of: a 4A molecular sieve and a 5A molecular sieve.

12. The system of claim 9, and further comprising a controller for switching each of the inlet valve, the outlet valve, and the carbon dioxide valve between the first position and the second position.

13. The system of claim 9, wherein the first sorbent bed and the second sorbent bed alternate between adsorbing $CO_2$ and desorbing $CO_2$.

14. The system of claim 9, wherein the system is operated at ambient temperature.

15. The system of claim 9, and further comprising a third sorbent bed having a desiccant for removing water, wherein the third sorbent bed is positioned upstream of the first sorbent bed and the second sorbent bed.

16. A method for removing carbon dioxide ($CO_2$) from a process air stream, the method comprising:
   supplying the process air stream to a first molecular sieve and a second molecular sieve to cause $CO_2$ to be adsorbed and removed from the process air stream;

reducing a pressure of one of the first and second molecular sieves to cause $CO_2$ to be desorbed and removed from the first and second molecular sieves so that that one of the first and second molecular sieves is adsorbing and the other molecular sieve is desorbing; and transferring exothermically generated heat from the molecular sieve that is adsorbing to the molecular sieve that is desorbing.

17. The method of claim 16, wherein the first molecular sieve and the second molecular sieve alternate between adsorbing and desorbing.

18. The method of claim 16, wherein each of the first molecular sieve and the second molecular sieve is selected from the group consisting of: a 4A molecular sieve and a 5A molecular sieve.

19. The method of claim 16, and further comprising adsorbing water from the process air stream.

20. The method of claim 19, wherein the water is adsorbed from the process air stream by a desiccant positioned upstream of the first molecular sieve and the second molecular sieve.

21. The method of claim 16, wherein reducing a pressure of one of the first and second molecular sieves comprises using a vacuum.

* * * * *